March 21, 1944.　　　S. PALKIN ET AL　　　2,344,560

FRACTIONATING COLUMN AND SCRUBBING TOWER

Filed Dec. 26, 1941　　　2 Sheets-Sheet 1

INVENTORS
S. Palkin
S. A. Hall

BY

ATTORNEYS

March 21, 1944.     S. PALKIN ET AL     2,344,560
FRACTIONATING COLUMN AND SCRUBBING TOWER
Filed Dec. 26, 1941     2 Sheets-Sheet 2

INVENTORS
S. Palkin
S. A. Hall

BY
ATTORNEYS

Patented Mar. 21, 1944

2,344,560

UNITED STATES PATENT OFFICE 2,344,560

FRACTIONATING COLUMN AND SCRUBBING TOWER

Samuel Palkin, Washington, D. C., and Stanley A. Hall, Arlington, Va.

Application December 26, 1941, Serial No. 424,476

1 Claim. (Cl. 261—112)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the people in the territory of the United States to take effect on the granting of a patent to us.

This invention relates to fractionating columns of the packed type and scrubbing towers for the separation and purification of materials by bringing about interaction between vapors and liquids.

One of the difficulties encountered in fractionating columns or towers of the packed type as differentiated from the bubble-cap or plate type is that of producing and maintaining an even wetting of the packing material by the "reflux" or condensate in its return flow down the tower to the still pot. Failure to accomplish this results in what is known as channeling and defeats to a degree the function of providing intimate contact between condensate and vapors. The intimacy of contact between condensate and vapor is the governing factor in the efficiency of a fractionating column. Another factor which prevents even wetting of packing materials is the fact that the rising vapors drive some of the reflux onto the wall of the column and away from the surface of the packing. Moreover, undesirable operating conditions affected by these factors increase as the cross-sectional area of the packed column increases. In columns commonly used in the various industries the cross-sectional area is necessarily large in order to meet the large capacity requirements. The capacity factor is often expressed in terms of the volume of liquid distilled per hour and frequently referred to as the "reflux rate." Such large columns, much more than the small columns generally used in laboratories, are subject to channeling and to the diversion of the reflux to the column wall from the packing. To compensate for lowered efficiency due to these causes, commercial columns are usually made very high relative to comparable laboratory columns. For example, a packed column of 6 or 7 feet in height with a diameter of 1 or 2 inches may be ample in its efficiency of separation of a given mixture or liquid into its constituents, but in constructing a column of much greater capacity, as for large scale operations (say a column 4 feet or more in diameter), it is often found necessary to use a column 3 or 4 times as high in order to insure an adequate efficiency for the separation of constituents, comparable with that obtainable in the smaller laboratory column.

The efficiency factor, which is a function of the degree of contact secured between vapor and liquid in the packing material, is generally expressed as "height equivalent to a theoretical plate" and is customarily abbreviated H. E. T. P. The H. E. T. P. is expressed as the vertical height of packing material of a given cross-sectional area required to effect a fractionation equivalent to that of one theoretically perfect bubble plate in a bubble plate type fractionating column. If an even wetting of the packing by the condensate occurs, the efficiency factor, for any given type of packing, should theoretically be independent of the cross-sectional area of the column. In practice, however, it has been found that the efficiency is not independent of the cross-sectional area, that for large capacity columns, the necessary increase in such area results in a substantial lowering of efficiency, that is an increase in the H. E. T. P. No effective means has heretofore been found in the case of packed columns of large cross-sectional area to prevent channeling and diversion of reflux to the column walls. In the present state of the art, there is no available satisfactory device or mechanism to insure an even wetting of the packing by the reflux throughout the entire height of the packing. Another difficulty encountered in fractionating columns of the packed type is that of resistance of the packing to the passage of vapors. This difficulty which becomes particularly serious at low operating pressures, such as when operating under vacuum, because of high vapor velocity. Resistance to vapor passage manifests itself by the development of a pressure differential between the top and bottom of the column and is known as "pressure drop." The pressure drop may be regarded as an index to the tolerance of a given packing to vapor passage under conditions of constant reflux rate. A factor in the matter of pressure drop is the percentage of the volume of voids which constitute the free space in the packing material. This is expressed quantitatively as "percent free space." However, other factors must also be considered. We have found that one of these other factors is the form or shape of the packing voids.

One object of this invention is to provide a rectifying column of the packed type having a low H. E. T. P. and at the same time having a large capacity.

Another object of this invention is the provision of a column with low "hold up" under conditions of optimum H. E. T. P.

Still another object of this invention is the provision of a column designed to insure the maintenance of an optimum relationship of reflux rate (capacity) to H. E. T. P. irrespective of column capacity.

A further object of this invention is the provision of such a column which will have simultaneously a low pressure drop, large capacity and low H. E. T. P. under varying conditions of use such as when fractionating at atmospheric pressure or under vacuum.

A still further object of this invention is the provision of a column structure capable of being used for different capacities without materially affecting the characteristics of H. E. T. P., low pressure drop and low hold up.

A still further object of this invention is the provision of a column of the type mentioned which can be manufactured in various sizes to provide different capacities without affecting substantially the other operating characteristics.

In our invention, we have overcome these difficulties by departing from the use of mass random packing and using instead a packing comprising generally a plurality of vertical independent and non-contacting flow rods, precisely spaced, and means for supplying each flow rod with a proportionate amount of reflux and vapor.

Our invention, with various modifications, is illustrated in the accompanying drawings and explained in the following description, from which a full understanding may be had by those skilled in the art.

Figure 2:
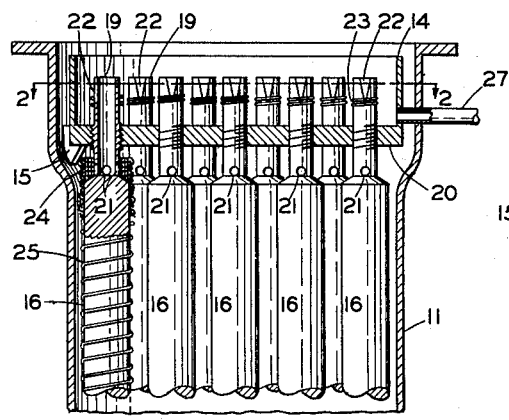
Figure 2 is a section along the line 2—2 of Figure 1.
Figure 2:
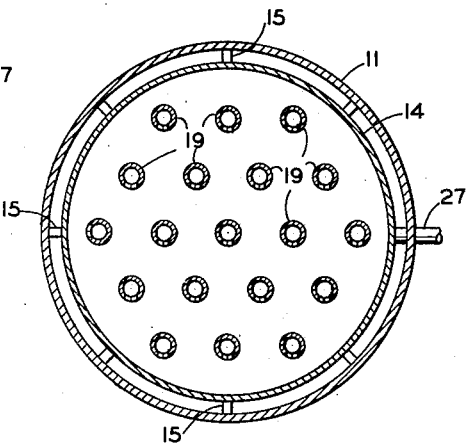
Figure 1:
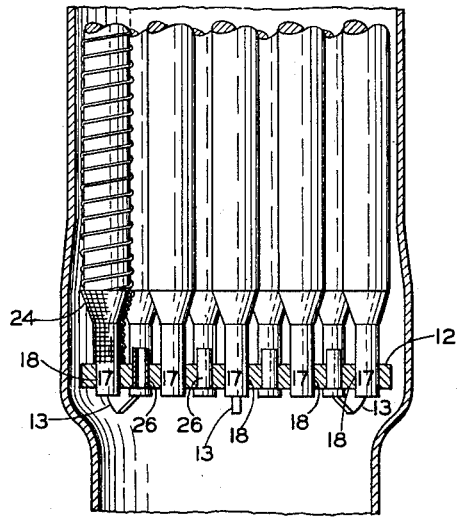
Figure 1 is an elevational section of a portion of one form of rectifying column employing the general features of our invention.

Referring with more particularity to Figures 1 and 2, the section of the fractionating tower column 11 above the still pot (not shown) which ordinarily contains the packing material is provided with a bottom plate 12 supported by brackets 13 and an upper basin 14 supported on brackets 15. Between the plate 12 and basin 14 a plurality of spaced vertical rods 16 are disposed. These rods, herein referred to as flow rods, may be of any suitable material, but preferably glass. These flow rods should preferably be spaced equally in all directions, such as on a pattern of equilateral triangles. The lower end of each flow rod tapers to a short stem 17. These stems are supported in correspondingly spaced apertures 18 through the bottom plate 12. The upper end of each flow rod is integral with a short vertical tube 19 which projects upward through the bottom 20 of the basin 14. The bottoms of the tubes 19 are provided with apertures 21, and the top with weirs 22 at a common hydrostatic level above the bottom of the basin 14. At the bottom of each weir a filament 23 of absorbent corrosion-resisting material, such as glass fiber, is disposed about the tubes 19 for the purpose of breaking surface tension of reflux liquid rising to this level. Where large diameter flow rods are used (about two centimeters or more), spreaders, such as fabric tubes 24, preferably of glass fabric to resist corrosion, are disposed about the upper ends of the flow rods 16 and project a short distance upward above the apertures 21, substantially as shown, and coils 25, preferably of glass thread, are wound around the flow rods 16 to evenly distribute the reflux. Instead of using coils 25, shallow grooves (not shown) may be provided on the lateral surfaces of the flow rods for the same purpose.

Through the bottom plate 12, between the stems 17, vapor tubes 26 are disposed projecting upward a short distance from the top of the said plate.

In operation, vapors from the still pot pass upward through the tubes 26, then proceed through the spaces around the flow rods 16, and thence pass upward between the column 11 and the sides of the basin 14 into the condenser (not shown). The condensate is then directed to a proportionator (not shown) from whence a reflux portion is returned through a pipe 27 to the basin 14 where it accumulates until it reaches a hydrostatic head above the lower end of the weirs 22 and then overflows into the tubes 19, passing out at the bottom through the apertures 21 over the end of the flow rods 16 and proceeds downward in the form of fine films over the surface of the flow rods 16. The liquid, flowing downwardly on the rods 16, falls on bottom plate 12, spills over the edges thereof, and is returned to the still pot for recycling.

Figure 3:
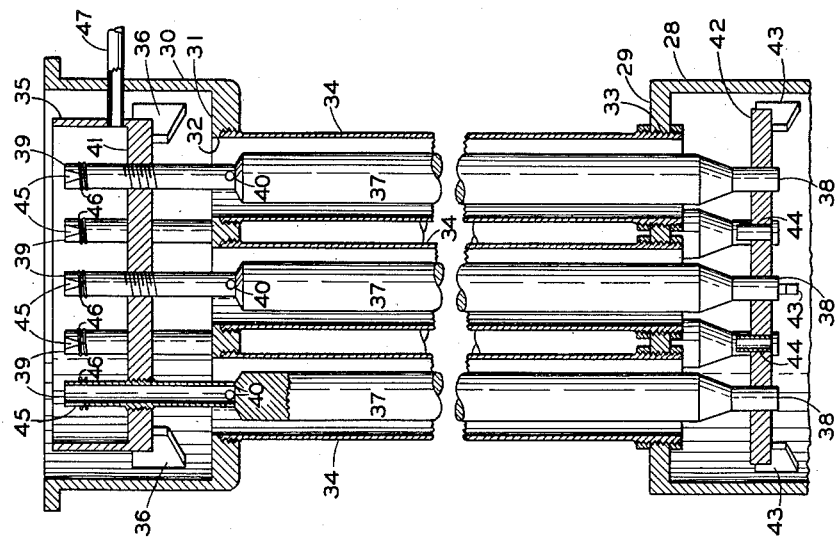
Figure 3 is an elevational section of a portion of a rectifying column illustrating a modified form of our invention.

The embodiment illustrated in Figure 3 is similar to that illustrated in Figures 1 and 2, except that instead of all of the flow rods being placed in one tower column, each rod is individually surrounded by a tube. To accomplish this, the column is made in three sections. The lower section 28 has a top plate 29, and the upper section 30 has a bottom plate 31. Both of these plates have vertically aligned apertures 32 and 33 in which the ends of the tubes 34 are held. These tubes comprise the middle section of the tower. Within the upper section 30, a basin 35 is disposed and is supported by brackets 36.

Flow rods 37, similar to the flow rods 16 in Figures 1 and 2, also have similar lower stems 38 and upper tubes 39 with holes 40 at the bottom. The upper part of each tube 39 is disposed through the bottom 41 of the basin 35 and is secured thereto. The stems 38 are held in position in a bottom plate 42 within the lower section 28. The bottom plate 42 is supported on brackets 43 and is provided with vapor tubes 44, similar to the tubes 26 in Figure 1. The tubes 39 project upward through the bottom 41 and terminate at a point below the upper end of the basin. At the upper end of the tubes 39 weirs 45 are also provided at a common hydrostatic level. These weirs also carry absorbent filaments 46 for breaking surface tension of reflux liquid rising to this level. In the embodiment shown in Figure 3, vapors from the still pass upward through the tubes 44, thence through the tubes 34, around the flow rods 37, thence through the annular space between the basin 35 and the housing of the upper section where they are directed into a condenser (not shown). The condensate from the condenser is directed to a proportionator (not shown) from whence a reflux portion is returned to the basin 35 through a pipe 47. The liquid accumulates in the basin until it overflows through the weirs 45 into the tubes 39, then passes out through the holes 40, and proceeds downward in the form of fine films over the surface of the flow rods 37, in which form it contacts the rising vapors. Liquid reaching the bottom plate 42 spills over the edge thereof and is returned to the still pot for recycling.

Figure 4:
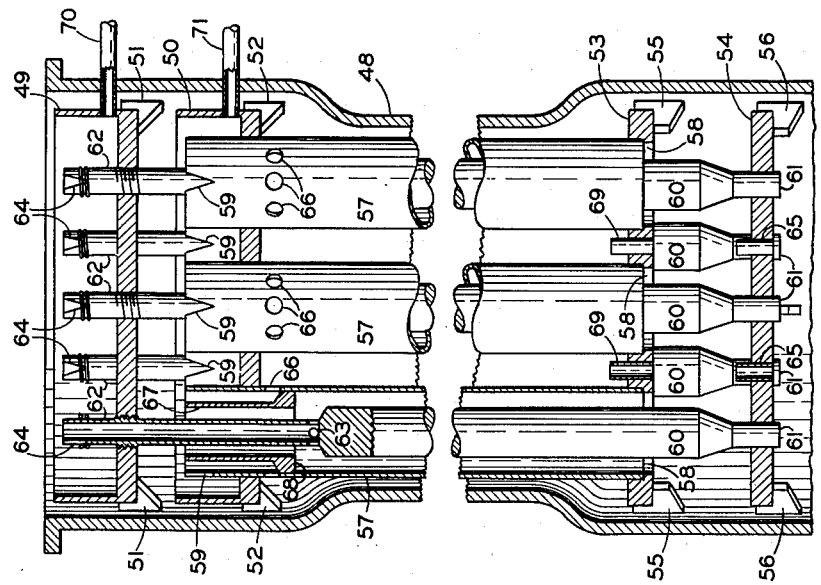
Figure 4 is an elevational section, partly broken away, of a rectifying column illustrating further modifications of our invention.

Another modification of our invention is shown in Figure 4 and generally combines features of both of the previously described embodiments. In this modification the tower 48 contains two basins 49 and 50 at the top, one above the other, supported by suitable brackets 51 and 52. At the bottom of the column two plates 53 and 54, also one above the other, are supported by brackets 55 and 56. Between the lower basin 50 and the upper plate 53, vertical tubes 57 are disposed, the lower end of each tube being held in an aperture 58 through the upper plate 53, and the upper part of the tube being held in an aperture through the bottom of the lower basin 50. The upper end of each tube 57 projects upward to a point below the top of the lower basin 50 and is provided with a weir notch 59. Within each tube 57, there is concentrically disposed flow rods 60, similar to those in the previous embodiments, having similar stems 61, and superposed tubes 62 with apertures 63 at the bottom. The tubes 62 project upward through the bottom of the upper basin 49 to a point below the top thereof and are provided with weirs 64 at a common hydrostatic level. The stems 61 at the bottom of the flow rods 60 are held in apertures through the lower plate 54, and vapor tubes 65 are also disposed through said lower plate between the rods 60.

The tubes 57 are provided with apertures 66 just below the bottom of the lower basin 50. Another tube 67 is concentrically disposed between the top of each tube 57 and the apertures 66 therethrough. The tube 67 is intermediate in size between the two concentric tubes 57 and 62. The tube 67 carries a lower flange 68 which extends to the inner surface of the tube 57 just below the apertures 66 preferably sloping downward toward them. Through the upper plate 53, between the tubes 57, vapor tubes 69 are provided. This embodiment of our invention functions as follows: Vapor rising from the still passes through the vapor tubes 65 into the spaces between the flow rods 60 and tubes 57 and also through the tubes 69 in the space surrounding the outer surfaces of the tubes 57. Vapor on the inner sides of the tubes 57 passes upward through the annular spaces between the tubes 67 and 62 and converges with vapor rising around the lower basin 54 and thence proceeds upward around the upper basin 50 into the condenser, the outlet of which is connected to a proportionator, from whence two portions of reflux condensate are returned, one into the basin 49 by a pipe 70 and another to the lower basin 50 through a pipe 71. The two portions accumulate in their respective basins until hydrostatic levels are reached which cause them to overflow through the weirs 64 and 59, respectively. Liquid flowing over the weirs 64 passes downward in the tubes 62 through the apertures 63 and over the surface of the flow rods 60 in the form of thin films in which form it intimately contacts vapors rising through the tubes 57. Liquid overflowing through the weirs 59 passes downward between the tubes 57 and 67 until it strikes the flange 68 which diverts the liquid through the apertures 66, from whence the liquid proceeds downward over the exterior surface of the tubes 57 in thin films, in which form they contact vapor rising in the space about the tubes 57. Liquid flowing to the bottom of the tubes 57 contacts the plate 53 and thence spills over the edges thereof and falls into the still pot. Liquid reaching the bottom of the rods 60 falls on the lower plate 54, spills over the edge thereof, and is also returned to the still pot for recycling.

Figure 5:
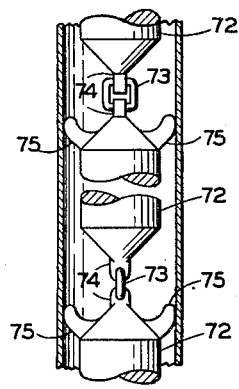
Figure 5 is a fragmentary elevational view illustrating a modified form of flow rod.

In practice we prefer to use glass material for the vertical flow rods used in the different embodiments. However, we have found it impossible to obtain long rods of glass (over two or three feet) that are sufficiently straight and have a uniform diameter within the necessary limits of tolerance for use in the various embodiments illustrated. Accordingly, we have devised means, illustrated in Figure 5, for using short sections 72 of rods fastened by suitable means, such as links 73 through ears 74 at the ends of the sections. These linked sections may be freely suspended in embodiments, such as that illustrated in Figures 1 and 2, that is, where a number of rods are housed together. However, in the tubular embodiments, such as the one illustrated in Figures 3 and 4, where each flow rod is contained within a tube, proper concentric spacing therein is essential for efficient operation. This spacing may be accomplished by spacing arms 75 projecting upward from each rod section to contact the inner sides of the tubes.

It will be noted that in all of the modifications described above, the reflux is made to flow and contact the rising vapor on surfaces which are convex in form. We have found that the use of such surfaces results in greater efficiency as compared with surfaces of the concave or flat type and consequently the use of convex surfaces exclusively materially increases the overall efficiency of the packing. This has been established by numerous experiments conducted by us. Results of some of these experiments are tabulated below:

| | Type of surface | Diameter of surface in mms. | Height of column in cms. | Rate of reflux cc./hr. | H. E. T. P. cms. | Percentage increase in H.E.T.P. |
|---|---|---|---|---|---|---|
| | | | | | | Percent |
| 1 | Convex | 10 | 26 | 45 | 1.2 | } 183.3 |
| | Concave | 10 | 26 | 45 | 3.4 | |
| 2 | Convex | 10 | 26 | 75 | 2.3 | } 165.2 |
| | Concave | 10 | 26 | 75 | 6.1 | |
| 3 | Convex | 10 | 26 | 120 | 3.3 | } 154.5 |
| | Concave | 10 | 26 | 120 | 8.4 | |
| 4 | Convex | 10 | 125 | 75 | 3.8 | } 89.5 |
| | Concave | 14 | 125 | 75 | 7.2 | |
| 5 | Convex [1] | 27 | 108 | 100 | 3.9 | } 38.5 |
| | Concave [1] | 31 | 108 | 100 | 5.4 | |
| 6 | Convex [1] | 42 | 100 | 300 | 5.8 | } 139.8 |
| | Concave [1] | 47 | 100 | 300 | 13.9 | |

[1] Spreaders used.

Having thus described our invention, we claim:

A rectifying tower comprising a plurality of vertical tubes, a housing for said tubes, a flow rod concentrically disposed in each of said tubes, there being spaces around said tubes and spaces between said tubes and rods for the passage of ascending vapors, basins above said rods and tubes, each having a reflux inlet, means for distributing liquid in one basin over the surfaces of said rods and for distributing liquid in the other basin over the outer surfaces of said tubes.

S. PALKIN.
STANLEY A. HALL.